(12) United States Patent
Celis

(10) Patent No.: US 7,913,654 B2
(45) Date of Patent: Mar. 29, 2011

(54) GAS SAVING DEVICE AND METHOD FOR DISSOCIATING WATER

(76) Inventor: Roberto V. Celis, Marikina (PH)

( * ) Notice: Subject to any disclaimer, the term of this patent is extended or adjusted under 35 U.S.C. 154(b) by 579 days.

(21) Appl. No.: 11/917,932

(22) PCT Filed: Jul. 11, 2006

(86) PCT No.: PCT/PH2006/000016
§ 371 (c)(1),
(2), (4) Date: Dec. 18, 2007

(87) PCT Pub. No.: WO2007/008091
PCT Pub. Date: Jan. 18, 2007

(65) Prior Publication Data
US 2010/0018477 A1    Jan. 28, 2010

(30) Foreign Application Priority Data
Jul. 12, 2005 (PH) .............................. 1-2005-000344

(51) Int. Cl.
*F02B 43/08* (2006.01)
(52) U.S. Cl. ....................... 123/3; 123/1 A; 123/DIG. 12
(58) Field of Classification Search .................. 123/1 R, 123/1 A, 3, 25 L, 568.15, 536–537, DIG. 12
See application file for complete search history.

(56) References Cited

U.S. PATENT DOCUMENTS

| | | | | |
|---|---|---|---|---|
| 2,295,209 A | * | 9/1942 | Guiles et al. | .................... 48/116 |
| 4,037,568 A | * | 7/1977 | Schreiber | .......................... 123/3 |
| 4,361,474 A | | 11/1982 | Shoaf et al. | |
| 4,380,970 A | * | 4/1983 | Davis | ................................ 123/3 |
| 4,403,576 A | | 9/1983 | Dimitroff et al. | |
| 4,750,453 A | | 6/1988 | Valdespino | |

* cited by examiner

*Primary Examiner* — Michael Cuff
*Assistant Examiner* — Hung Q Nguyen
(74) *Attorney, Agent, or Firm* — David A. Guerra

(57) ABSTRACT

The method consists of replacing the exhaust pipe directly below the exhaust manifold of an engine with an expanded exhaust pipe that encases the water dissociation device (9), consisting of a long, spirally formed super heater, preferably stainless steel tubing (7) to have vast area of contact to maximize heat transfer to the passing water. The spirally formed tubing causes the passing water to turbulently move in circular manner, superheat, exert great pressure on the inner wall of the superheater tubing, discharges and expands in the large dissociation chamber (9) into its constituents hydrogen and oxygen gases that are immediately sucked into the combustion chamber of the engine to cause efficient combustion of the fuel, reduce emission, add power and speed, increase mileage and release oxygen.

12 Claims, 2 Drawing Sheets

GAS SAVING DEVICE AND METHOD FOR DISSOCIATING WATER

CROSS-REFERENCE TO RELATED APPLICATIONS

Figure 1:
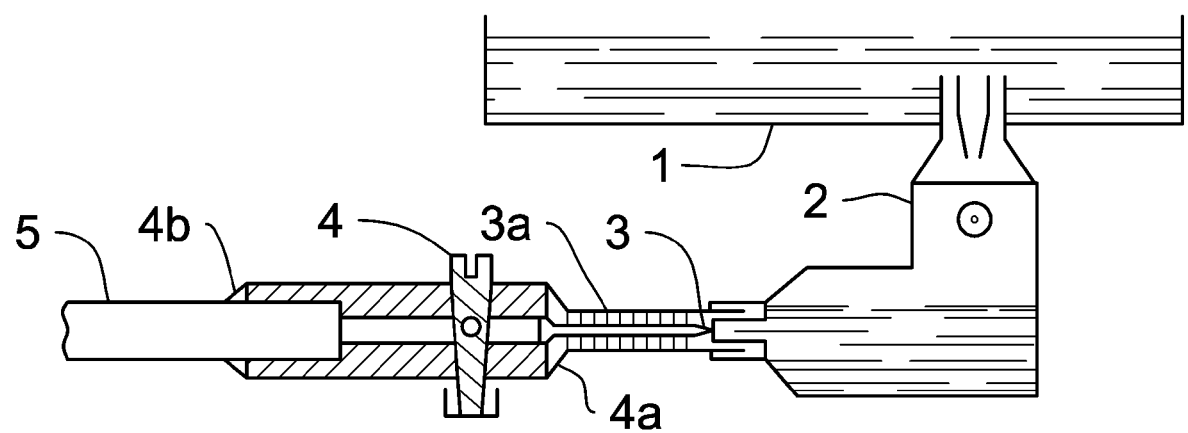

This application is an U.S. national phase application under 35 U.S.C. §371 based upon co-pending International Application No. PCT/PH2006/000016 filed on Jul. 11, 2006. Additionally, this U.S. national phase application claims the benefit of priority of co-pending International Application No. PCT/PH2006/000016 filed on Jul. 11, 2006 and Philippines Application No. 1-2005-000344 filed on Jul. 12, 2005. The entire disclosures of the prior applications are incorporated herein by reference. The international application was published on Jan. 18, 2007 under Publication No. WO 2007/008091.

TECHNICAL FIELD

The present invention relates to a gas saving method and device and more particularly to a method for converting water into fuel enhancer for combustion engines by dissociating water into its constituent hydrogen and oxygen gases by efficiently utilizing the hot exhaust gases of the engine for heating the dissociation device. The hydrogen and oxygen gases produced are immediately introduced into the combustion chamber through the intake manifold of the engine to burn and cause efficient combustion of the fuel that results in fuel savings, reduce emission, add power and speed to the engine and release oxygen from the tail pipe for a healthy and friendly environment. The method and device is safe to use because storage of hydrogen is not necessary.

BACKGROUND OF THE INVENTION

Although hydrogen is a clean and a powerful source of energy, it is a chemically active element and not available in the free state in nature in elemental gaseous form, it must be produced and stored for utilization in engines, but hazardous to the monitoring public when carried on board a vehicle in case of accident.

Hydrogen can be obtained from compounds by breaking chemical bonds but requires a substantial amount of energy to accomplish. From hydrocarbons, a mixture of methane and steam is heated to a high temperature in the presence of catalysts in producing large quantities of hydrogen. From water, hydrogen is produced by electrolysis but it is slow a process and insufficient to power a vehicle when carried on board.

Methods of producing hydrogen are specifically exemplified in U.S. Pat. Nos. 3,699,718, 3,786,138, 3,816,609, 3,859,373, 4,069,303 and 4,202,744. These methods include, steam-light hydrocarbon reforming, partial oxidation of hydrocarbons and other carbonaceous matter and coal gasification process. All the above processes require storage of hydrogen to be carried on board to be used as fuel for motor vehicles and would create great danger to the motoring public.

Liquid water would therefore offer a convenient and compact source of hydrogen and oxygen fuel for a combustion engine because it is safe to use.

SUMMARY OF THE INVENTION

The invention provides for a gas saving device and method for dissociating water into its constituents hydrogen and oxygen gases by utilizing the heat energy of the hot exhaust gases of an engine between temperatures of 710° F. and 950° F. in an efficient method. The method consist of replacing the exhaust pipe directly below the exhaust manifold of the engine with an expanded exhaust pipe that encases the water dissociation device. This dissociation device consist of a long spirally formed superheater tubing preferably stainless steel, with a vast area, that maximizes contact between the superheater tubing and the rapidly passing water. The spirally formed tubing causes the high speed passing water to turbulently move in circular manner, expands and exert great pressure on the inner wall of the superheater tubing to further absorb more heat between 710° F. and 950° F. (Below 710° F. condensation occurs). The high pressure superheated steam, discharges into a large stainless steel cylindrical dissociation chamber, rapidly expands and dissociates into its constituent hydrogen and oxygen gases. The hydrogen and oxygen gases so produced are immediately drawn into the combustion chamber through the intake manifold of the engine to burn and causes efficient combustion of the fuel that results in fuel savings, add power and speed to the engine, reduces emission, cools the engine, reduces engine wear, and releases oxygen to make the environment more healthful.

When the engine stops, the spring-loaded valve automatically closes and prevents flooding.

DETAILED DESCRIPTION

Figure 2:
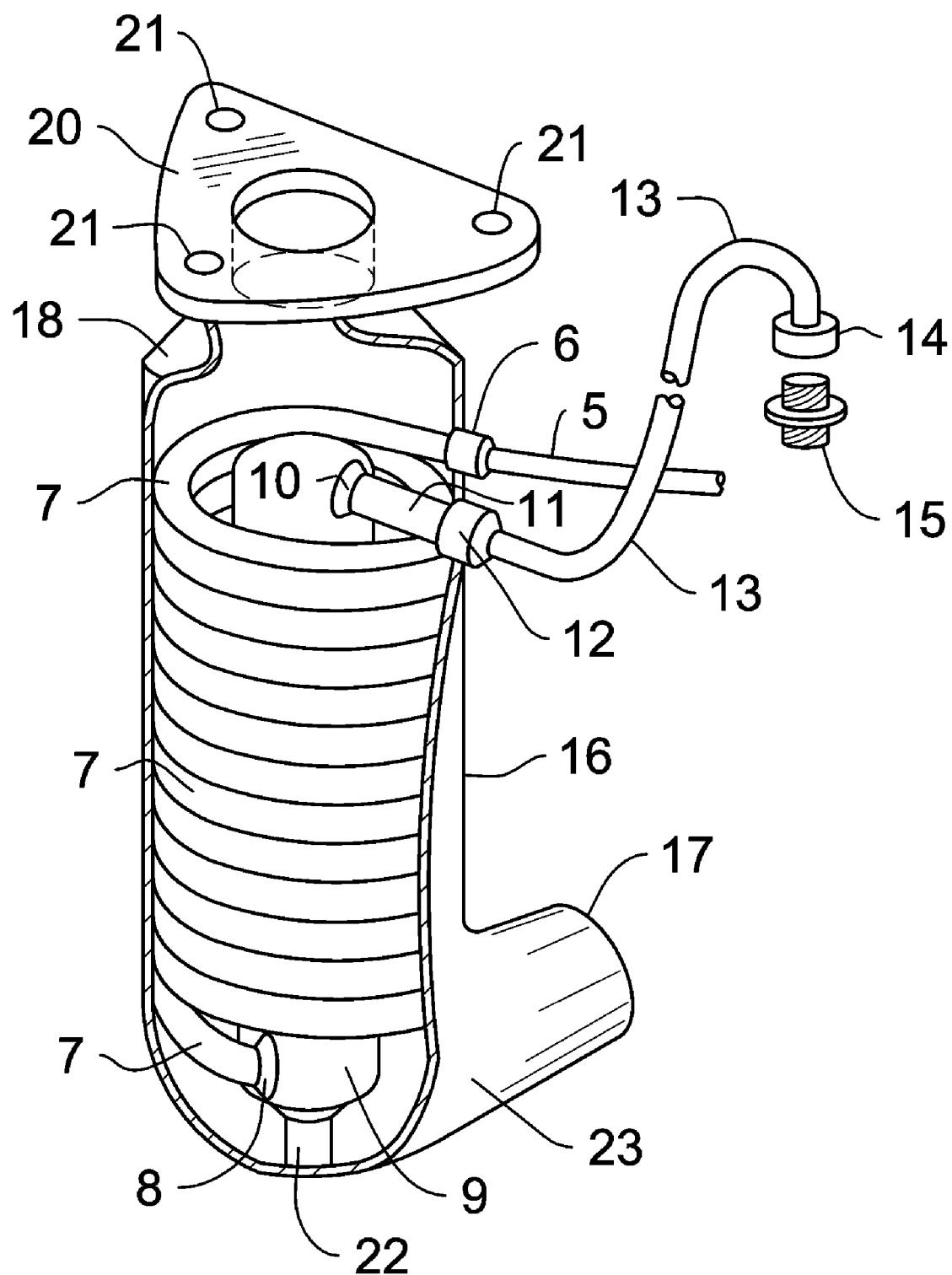

With reference to FIG. 2 of the isometric partially cut-away view of the water dissociation device, is seen to include an expanded exhaust pipe 16 adapted to be connected to the exhaust manifold of an engine, a spiral superheater tubing 7, encased inside said expanded exhaust pipe, said exhaust pipe having an exhaust gas inlet 20, and an external gas outlet 17 at the opposing end, to allow the hot exhaust gas from the engine to pass through and heat the spiral superheater tubing between 710° F. and 950° F.; said spiral superheater tubing having water supply inlet 6 to one end thereof, a dissociation chamber 9 is provided inside said expanded exhaust pipe and connected to the opposing end of said spiral superheater tubing at 8, said dissociation chamber having an outlet that discharges the dissociated hydrogen and oxygen gases into the intake manifold through outlet 10. Outlet pipe 11 is connected and in fluid communication with conduit 13, at outlet coupling 12, through intake manifold adaptor 15, that is connected to conduit 13, by coupling 14.

With reference to FIG. 1 of the cross-sectional view of the water dissociation device flow control method of the gas saving device, is seen to include a water tank, a transparent dextrose-like tube 2 that is anchored and in fluid communication with tank 1. Stainless spring loaded valve 3 which is encased in tube 3a is in fluid communication with tube 2 and secured thereof. Valve 3 is coupled with gate valve 4 at 4a and in fluid communication therewith. Water supply tube 5 is coupled at 6 with the said spiral superheater tubing 7.

When the engine is started, the suction force from the engine causes the water from the supply tank to be drawn toward the combustion chamber of the engine. This suction force causes the stainless spring loaded valve 3 to be actuated to allow the water to flow through said spring loaded valve. The rate of flow of water is regulated by gate valve 4. The water passes through the spiral superheater tubing in high speed, circular and turbulent manner making the water to absorb heat, superheat, expand and dissociate into its constituent hydrogen and oxygen gases in the dissociation chamber.

The dissociated hydrogen and oxygen gases are immediately sucked and burned with the fuel in the combustion chamber. Since hydrogen burns 7-times faster than gasoline and diesel fuels, and release high amount of heat energy upon combustion, it therefore causes the fuel to burn completely to prevent carbon emission, save fuel, add mileage, power and speed to the engine.

I claim:

1. A gas saving device utilizing exhaust gas of an internal combustion engine comprising:
    an expanded exhaust pipe adapted to be connected to an exhaust manifold of an engine;
    a spiral superheater tubing encased inside said expanded exhaust pipe, said exhaust pipe having an exhaust gas inlet and an external gas outlet at opposing ends;
    said spiral superheater tubing having a water supply inlet on one end thereof; and
    a dissociation chamber provided inside said expanded exhaust pipe and connected in fluid communication to the opposing end of said spiral superheater tubing, said dissociation chamber having an outlet that discharges dissociated hydrogen and oxygen gases into an intake manifold of said engine.

2. The gas saving device in accordance with claim 1, wherein said water supply inlet is provided with a water feed controller that regulates the flow of water into said spiral superheater tubing.

3. The gas saving device in accordance with claim 2, wherein said water feed controller having a spring loaded valve being actuated by a suction pressure of said engine; and a gate valve included thereto to regulate the flow of water from said spring loaded valve.

4. The gas saving device in accordance with claim 1, wherein said spiral superheater tubing is made of stainless steel.

5. The gas saving device in accordance with claim 2, wherein a water tank is provided hereto for supplying water to the water feed controller.

6. The gas saving device in accordance with claim 1, wherein said dissociation chamber is orientated internally of said spiral superheater tubing.

7. The gas saving device in accordance with claim 6, wherein said dissociation chamber having a longitudinal axis substantially parallel with said expanded exhaust pipe.

8. A gas saving device utilizing exhaust gas of an internal combustion engine comprising:
    an expanded exhaust pipe connectable to an exhaust manifold of an engine, said expanded exhaust pipe having at least an exhaust gas inlet and a gas outlet at opposing ends;
    a spiral tubing encased inside said expanded exhaust pipe, said spiral tubing having a water supply inlet on one end thereof; and
    a dissociation chamber provided inside said expanded exhaust pipe and inside of said spiral tubing, said dissociation chamber being connectable and in fluid communication to an opposing end of said spiral tubing, said dissociation chamber having an outlet that discharges dissociated hydrogen and oxygen gases into an intake manifold of said engine.

9. The gas saving device in accordance with claim 8, wherein said dissociation chamber having a longitudinal axis substantially parallel with said expanded exhaust pipe.

10. The gas saving device in accordance with claim 8, wherein said exhaust gas inlet of said expanded exhaust pipe is parallel with a longitudinal axis of said expanded exhaust pipe.

11. The gas saving device in accordance with claim 10, wherein said exhaust gas outlet of said expanded exhaust pipe is angled with said longitudinal axis of said expanded exhaust pipe.

12. The gas saving device in accordance with claim 8, wherein said water supply inlet of said spiral tubing and said outlet of said dissociation chamber being located substantially between said exhaust gas inlet and outlet of said expanded exhaust pipe.

\* \* \* \* \*